United States Patent [19]
O'Brien et al.

[11] Patent Number: 5,874,989
[45] Date of Patent: Feb. 23, 1999

[54] BUS DOOR OBSERVATION SYSTEM

[75] Inventors: Robert E. O'Brien; Paul Rongos, both of Fort Wayne, Ind.

[73] Assignee: Custom Radio Corporation, Fort Wayne, Ind.

[21] Appl. No.: 762,158

[22] Filed: Dec. 9, 1996

[51] Int. Cl.$^6$ ........................................................ H04N 7/18
[52] U.S. Cl. ............................................ 348/148; 340/433
[58] Field of Search ................................... 348/148, 149, 348/154, 152; 340/433; H04N 7/18

[56] References Cited

U.S. PATENT DOCUMENTS

| | | |
|---|---|---|
| 3,732,368 | 5/1973 | Mahlab . |
| 3,819,856 | 6/1974 | Pearl . |
| 4,080,629 | 3/1978 | Hammond . |
| 4,160,999 | 7/1979 | Claggett . |
| 4,217,606 | 8/1980 | Nordmann . |
| 4,644,845 | 2/1987 | Garehime . |
| 4,831,438 | 5/1989 | Bellman . |
| 4,881,135 | 11/1989 | Heilweil . |
| 4,949,186 | 8/1990 | Peterson . |
| 5,012,335 | 4/1991 | Cohodar . |
| 5,293,151 | 3/1994 | Rose ........................................ 340/433 |
| 5,319,394 | 6/1994 | Dukek . |

FOREIGN PATENT DOCUMENTS

WO95/26610  10/1995  WIPO .............................. H04N 7/18

Primary Examiner—Brian Casler
Assistant Examiner—Luanne P. Din
Attorney, Agent, or Firm—Baker & Daniels

[57] ABSTRACT

A vehicle installed monitoring system which allows a driver of a bus or a like vehicle to observe an area outside the vehicle and around the vehicle door. The vehicle installed monitoring system comprises a video camera mounted on the vehicle and connected to a monitor disposed near the driver. The video camera is mounted so as to view the area surrounding the vehicle door, and includes an attached microphone which transmits noises around the area to the monitor. The monitor includes a video display and a loudspeaker to allow the driver to audio-visually monitor the area surrounding the vehicle door. The monitor also includes a reminder device, a flashing light in this case, which attracts the driver's attention and reminds the driver to inspect the monitor and verify that the area around the door is clear before driving off. The camera, microphone and monitor are activated when the driver opens the vehicle door. The flashing light is activated when the driver closes the vehicle door and remains activated for a predetermined time period. The camera, microphone and monitor remain activated until the driver operates a reset switch to reset the monitoring system.

20 Claims, 2 Drawing Sheets

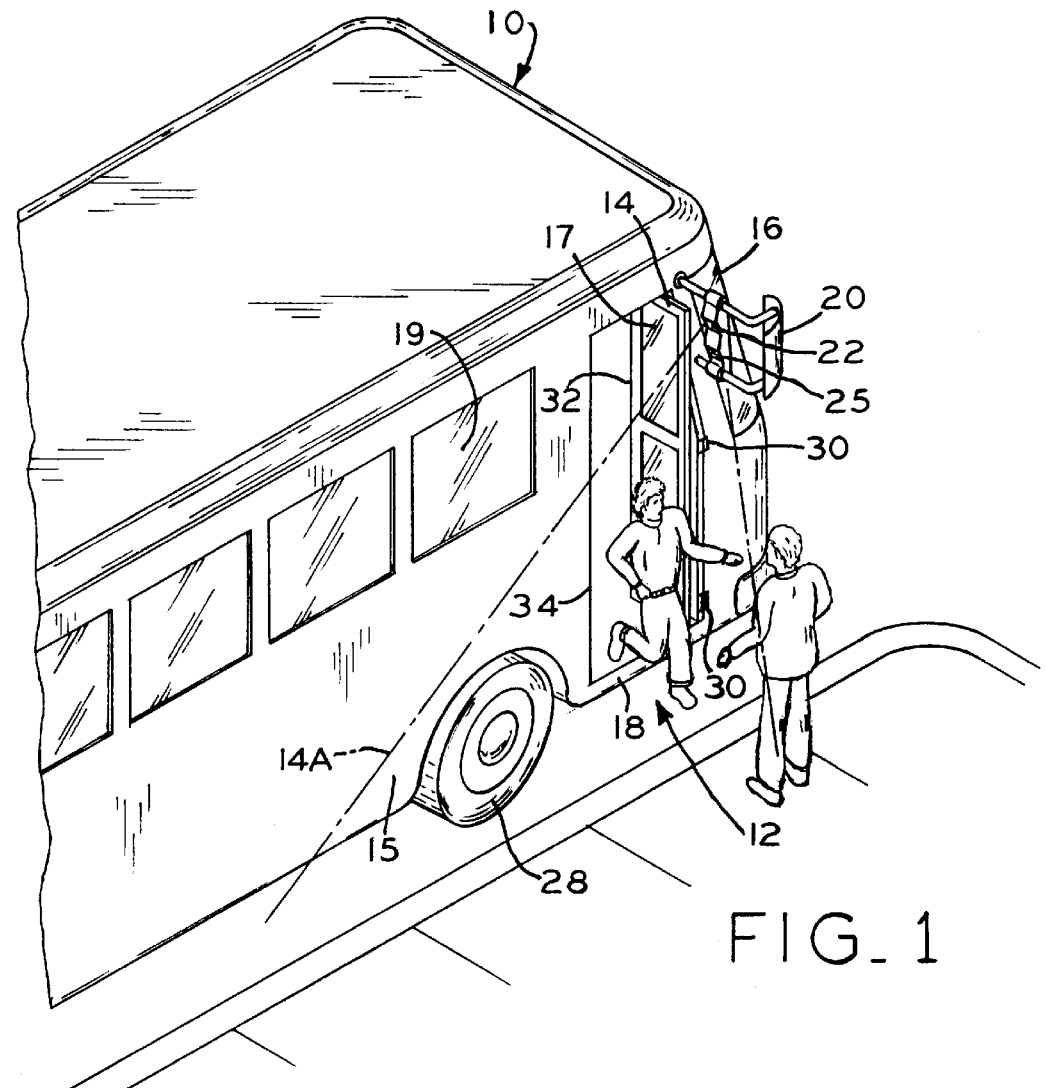
FIG_1
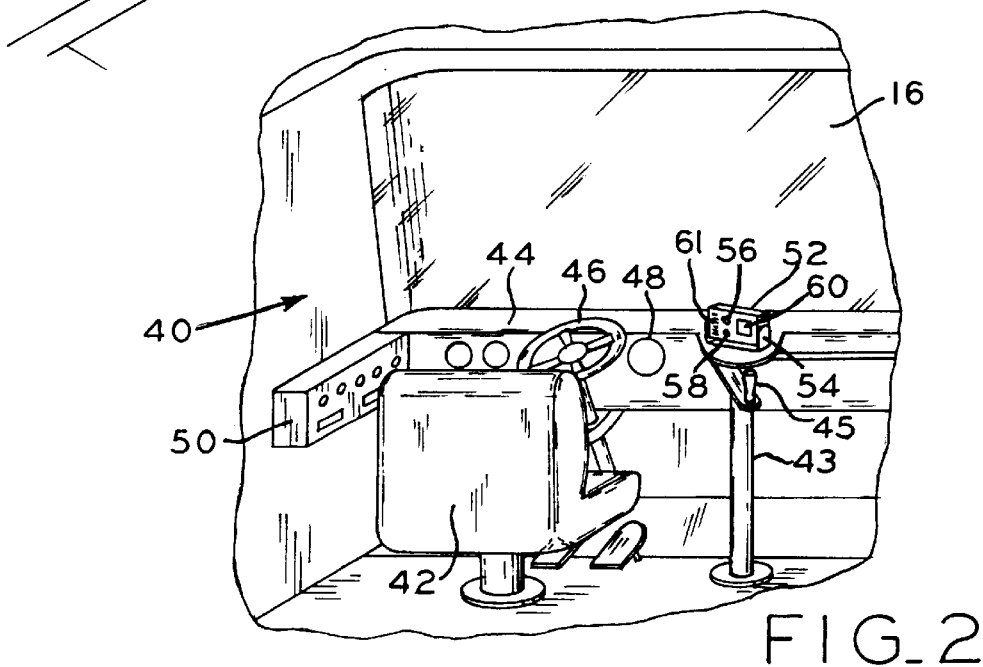
FIG_2

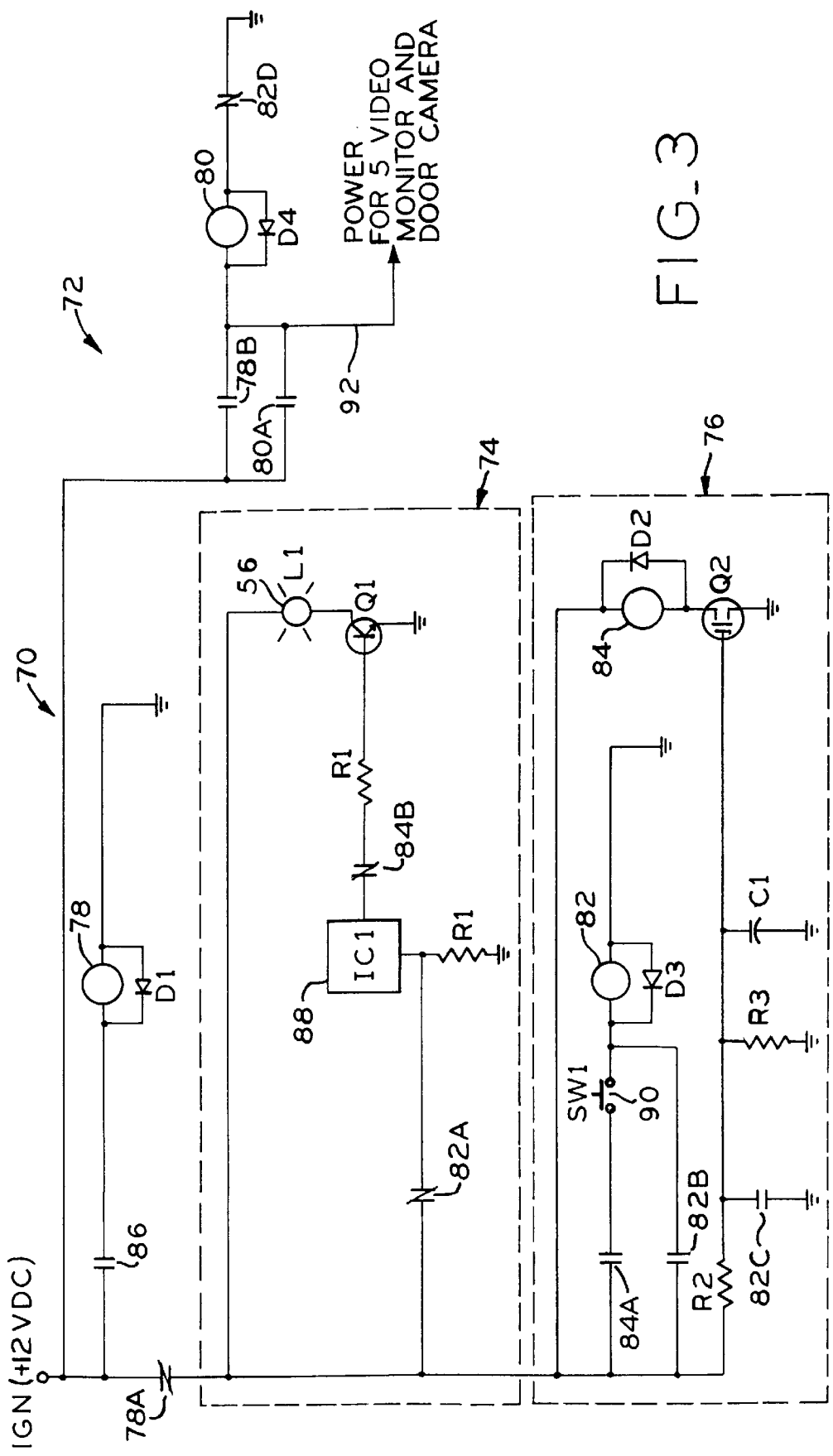

BUS DOOR OBSERVATION SYSTEM

BACKGROUND OF THE INVENTION

1. Field of the Invention

The present invention relates to a vehicle installed monitoring system and more particularly to a vehicle installed monitoring system for allowing a driver of a bus or a like vehicle to monitor an area around a door of the vehicle.

2. Description of the Related Art

A driver of a bus or a like vehicle always needs to be aware of the presence of people near the bus when operating the bus. The need to be aware of the bus surroundings is especially important during the frequent bus stops when passengers are entering onto or exiting from the bus. During these stops, the driver should be able to fully observe and monitor all areas of the bus and areas surrounding the bus so that the driver can prevent or quickly react to potentially dangerous situations.

Of particular importance is the area immediately surrounding the door due to the constant movement of passengers through this area during the frequent stops. The heavy amount of passenger movement through this area can create dangerous situations because passengers in this area may not be fully prepared for the movement of the bus when the bus begins moving off and the driver may start driving off without realizing that passengers are fully clear of the bus. It is not uncommon for a person exiting the bus to have a piece of clothing, or an article they are carrying get caught onto the bus door or side as the bus begins moving off, creating a potentially dangerous, or even life threatening situation. This problem is especially acute in the operation of school buses since children are more likely to exit the bus hurriedly and may not be particularly careful as they exit.

The possibility of the occurrence of the above described situation may be increased by the fact that the bus driver is usually unable to observe the entire area around the door. The driver of a conventionally configured bus while seated is unable to monitor the outside peripheral areas of the door, and therefore may be unaware of any dangerous situations which may exist in that area. Additionally, the driver may be distracted and unable to check that all passengers have safely exited from the bus. Again, this problem may be especially acute in the operation of school buses. Further, the driver may have fallen into the habit of quickly driving off without checking that all passengers have safely exited and cleared the area around the bus.

In order to avoid the above described situation, what is needed is a vehicle installed monitoring system that provides video images of the exterior area surrounding the bus door and reminds the driver to inspect the images each time the bus door is closed prior to driving off. Conventional vehicle installed monitoring and observation systems do not provide such capabilities.

One type of a vehicle installed monitoring system comprises a video camera mounted at the rear of the vehicle which allows a driver to monitor the area around the rear of the vehicle and to verify that the area is clear before backing up the vehicle. Such systems are used frequently with, for example, large trucks which are backed into loading areas to take on cargo. These rear observation systems may be activated when the driver places the vehicle in reverse. However, such a system is used to verify that an area behind a truck is clear, and thus is not suited for monitoring an area around a bus door and reminding the driver to inspect a video image during certain operations.

Another type of vehicle installed monitoring system comprises a video camera and a recorder device disposed inside the vehicle and is designed to monitor and record activity inside the vehicle. One such system includes a video camera mounted inside the front of a school bus facing the passenger area such that the video camera can monitor and record the activity inside the bus. However, such a system is designed to monitor the passenger area of the vehicle and is not suited for allowing the driver to monitor blind spots outside the bus around the vicinity of the bus door.

Yet another type of vehicle installed monitoring system comprises a video camera mounted on the vehicle's dash board to record events which occur in the immediate front vicinity of the vehicle. Such systems are commonly installed in, for example, police vehicles to provide evidence of the activities around the police vehicle and to record characteristics of stopped persons and vehicles. Again, such a system is not designed to allow the driver of a bus or a like vehicle to monitor an area around the exterior of the door and is not suited for use on a bus or a like vehicle.

Therefore, what is needed is a vehicle installed monitoring system for use with a bus or a like vehicle which allows a bus driver to monitor the area immediately surrounding the bus door to verify that potentially dangerous situations do not exist in the monitored area before driving off.

What is also needed is a vehicle installed monitoring system for monitoring an area around a bus door which reminds the bus driver to inspect a video image provided by the monitoring system immediately after closing the bus door prior to driving off. The reminder mechanism may remain activated for a predetermined time period following the closing of the door and may automatically deactivate after the predetermined time period. The monitoring system may further allow the driver to manually reset the monitoring system after the reminder mechanism is automatically deactivated.

SUMMARY OF THE INVENTION

The present invention is a vehicle installed monitoring system which allows a driver of a bus or a like vehicle to monitor the area immediately surrounding the vehicle door and reminds the driver to inspect a video image of the area during predetermined times, particularly after closing the vehicle door prior to driving off.

The present monitoring observation system comprises a video camera which is mounted near the bus door and provides video images to a monitor mounted near the driver. The monitor includes a reminder device which reminds the driver to inspect the video image on the monitor after closing the vehicle door prior to driving off. The reminder device is activated for a predetermined period of time after the driver closes the bus door. The reminder device may comprise a visual device, such as a flashing light, or an audio device. After the reminder mechanism is automatically deactivated, the driver is able to manually reset the observation system.

The present monitoring system also includes a microphone attached to the video camera and a loud speaker attached to the monitor to allow the driver to monitor noises in the area around the bus door. A video recorder may be included to record the activities in the vicinity of the door.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a perspective view of a bus or a like vehicle having the present invention mounted thereon;

FIG. 2 is a rear perspective view of the driver area of the vehicle of FIG. 1, showing components of the present invention mounted therein; and FIG. 3 is a schematic diagram of a control system for controlling the operation of the components of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION OF AN EXEMPLARY EMBODIMENT

The embodiments disclosed below are not intended to be exhaustive or limit the invention to the precise forms disclosed in the following detailed description. Rather, the embodiments are chosen and described so that others skilled in the art may utilize their teachings.

The bus door monitoring system of the present invention comprises a video camera mounted near the bus door, a monitor mounted near the bus driver and a control system connected to the video camera, the monitor and a bus door operating mechanism. The video camera is coupled to the monitor and provides video images of the area around the bus door. The monitor includes a reminder device which reminds the driver to inspect the monitor during predetermined time periods. The control system controls the operation of the bus door observation system, including activating and deactivating the reminder device based on the operation of the bus door operating mechanism. The reminder device is activated for a predetermined period of time, during which time the operation of the bus is not inhibited, but the monitor cannot be deactivated. After the reminder device is deactivated, the monitor remains activated, but the driver can manually reset the monitoring system As shown in FIG. 1, video camera 22 is mounted on the exterior of bus 10 near side view mirror 20 to provide a view of the area 14A around bus door 14. Bus door 14 is attached to bus 10 at hinges 30 and door edge 32 engages bus side 34. Camera 22 is mounted to allow a wide, unobstructed view of area 14A, particularly around entrance and exit area 12, platform 18 and wheels 28. Although FIG. 1 shows camera 22 mounted forward of door 14, near front window 16, on side view mirror 20, it should be clear that is video camera 22 may be mounted in any convenient position on bus 10 as long as video camera 22 has a wide, unobstructed view of the area around door 14. For example, camera 22 may be mounted on the side of bus 10, rear of door 14 and near the height of side windows 19 as long as such a position affords the required view of the area around door 14.

Video camera 22 comprises any conventional video camera that is compact and durable enough to be mounted on the side of bus 10. Video camera 22 is weatherproof, however, non-weatherproof cameras may be used if such cameras are enclosed in a weatherproof housing. Video camera 22 also includes attached microphone 25 which transmits the noise around the monitored area to loudspeaker 61 which is attached to monitor 52. Preferably video camera 22 and microphone 25 are formed as an integral unit, however, it is clear that any suitable microphone may be attached to a video camera to provide the video and audio monitoring capabilities. Monitor 52 may be an integral unit which includes a video display and a built-in loudspeaker for outputting the signals from video camera 22 and microphone 25. Microphone 25 and loudspeaker 61 allow the driver to audio-visually monitor the area around door 14.

Video camera 22 is connected to and transmits a video image to monitor 52 mounted near a driver seated in driver area 40. Once activated, the video image is displayed on video display 60 on monitor 52 until reset by the driver.

As further shown in FIG. 2, monitor 52 is mounted in driver area 40 within easy viewing of a driver seated in driver seat 42. In the exemplary embodiment, monitor 52 is mounted on door operating device 45 located on stand 43 next to the driver. Many bus designs include such stand 43 with operating device 45, such as a handle, for manually operating a door operating mechanism which opens and closes door 14. It is clear that monitor 52 may be conveniently mounted near such a door operating handle. Monitor 52 may be mounted at an angle to face the driver such that the driver looks towards monitor 52 each time the driver operates door operating device 45.

In another embodiment, monitor 52 is mounted on dashboard 44 via mount 54. Dashboard 44 is a convenient location for monitor 52 since the area around the dashboard is directly in front of driver seat 42, thus monitor 52 is within the driver's field of vision when the driver is seated in driver seat 42. It is preferable to place video monitor 52 away from the center of the driver's field of view, particularly over steering wheel 46 and indications 48, to reduce the distraction to the driver when monitor 52 is deactivated or is not needed. Monitor 52 is disposed at the right side of the driver, since the driver is likely to be looking right, toward door 14, when the bus is stopped and passengers are entering or exiting the bus.

It is clear that monitor 52 may be mounted anywhere within driver area 40 as long as monitor 52 is in easy view of the driver and does not interfere with the operation of the bus. For example, many bus designs also include a separate control panel, indicated by reference numeral 50, which include various controls, including bus door operating mechanism controls. It is clear that monitor 52 may also be mounted near such a control panel.

Monitor 52 includes video display 60 for displaying the images transmitted by video camera 22, and loudspeaker 61 for outputting noises picked up and transmitted by microphone 25. The combination of video display 60 and loudspeaker 61 allows the driver to audio-visually monitor the area around bus door 14. Monitor 52 is automatically activated by the opening of door 14 and remains activated until door 14 is closed, a predetermined time elapses, and monitor 52 is reset by the driver using attached reset switch 58. Also, each time door 14 is closed, a reminder device, which may comprise a flashing light or an audio signal, is activated during the predetermined time period.

Monitor 52 also includes flashing light 56 which functions as a reminder device that reminds the driver to inspect monitor 52 to verify that the area around door 14 is clear before driving off. The operation of monitor 52, along with flashing light 56, is controlled by control system 70 which is connected to the bus door operating mechanism (not shown). In the exemplary embodiment, flashing light 56 is installed as part of monitor 52. However, it should be understood that a separate flashing light may be mounted to a conventional monitor which does not include such a light and may be configured to operate in the same manner as installed flashing light 56. The details of the components and operation of control system 70 is further described below.

Flashing light 56 is activated each time the driver closes door 14 and remains activated for a predetermined period of time, in this case about 6 sec. The flashing light reminds the driver to inspect monitor 52, but does not inhibit the operation of the bus in anyway. Thus, the driver is free to drive off while monitor 52 and flashing light 56 are activated. After the predetermined period of time has elapsed, flashing light 56 automatically is deactivated, but monitor 52 remains activated. The driver cannot reset the bus door observation system and deactivate monitor 52 while flashing light 56 is activated, but may do so after the predetermined time delay has elapsed and flashing light 56 has been automatically deactivated.

The operation of the present bus door monitoring system is controlled by control system 70, shown in FIG. 3, which is operatively connected to video camera 22, monitor 52 and the bus door operating mechanism. Although not shown, the bus door operating mechanism may comprise any conventionally known device which controls the opening and the closing of the bus doors and is capable of providing an indication of the open or closed state of the bus door. Such door operating mechanisms are well known in the art and any one of such mechanisms may be used with the present bus door monitoring system.

As shown in FIG. 3, control system 70 comprises power circuit 72, flashing circuit 74 and timer circuit 76. Power circuit 72 includes door closing coil 78 having associated contacts 78A–B, and power supply coil 80 having associated contact 80A. Timer circuit 76 includes deactivation coil 82 having associated contacts 82A–D, and timer coil 84 having associated contacts 84A–B. The operation of control system 70 is described below.

Initially, when the bus engine ignition is on and bus door 14 is opened, door switch contact 86 is closed, energizing door closing coil 78. Energizing door closing coil 78 opens contact 78A and closes contact 78B. The opening of contact 78A deenergizes flashing circuit 74 and timer circuit 76. The closing of contact 78B energizes power supply coil 80 and energizes camera 22 and monitor 52 via power connection line 92. Energizing power supply coil 80 closes contact 80A which latches power supply coil 80 into the energized state. Power remains applied to monitor 52 and camera 22 as long as power supply coil 80 is energized.

When the driver closes bus door 14, door switch contact 86 opens to de-energize door closing coil 78. De-energizing door closing coil 78 closes contact 78A, thereby energizing flashing circuit 74 and timer circuit 76. Contact 78B opens, but does not have an effect on the power supplied to monitor 52 or camera 22 since power supply coil 80 is latched to the energized state by closed contact 80A.

When flashing circuit 74 is energized, power is applied to flashing timer circuit 88 through closed contact 82A, which turns on transistor Q1, via closed contact 84B, to activate flashing light 56. Flashing light 56 then remains activated for about six seconds after bus door 14 is closed. The six second time delay is implemented by the combination of capacitor C1 and resistor R3. Capacitor C1 requires about 6 seconds to become fully charged and turn on transistor Q2. The delay time may be set as desired by varying the values of capacitor C1 and resistor R3. When transistor Q2 is turned on, timer coil 84 becomes energized thereby opening contact 84B. The opening of contact 84B turns off transistor Q1, thereby turning off flashing light 56.

Manual switch 90 allows the driver to reset the system and deenergize camera 22 and monitor 52 after timer coil 84 has been energized and flashing light 56 has turned off. When manual reset switch 90 is depressed with timer coil 84 energized, manual deactivation coil 82 is energized via closed contact 84A, thereby opening contacts 82A and 82D and closing contacts 82B and 82C. The opening of contact 82A deenergizes flashing timer circuit 88. The closing of contact 82B allows deactivation coil 82 to remain energized even if contact 84A opens. The closing of contact 82C discharges capacitor C1 to turn off transistor Q2. Finally, the opening of contact 82D deenergizes power coil 80, which deenergizes power coil 80 to open contact 80A, thereby deenergizing monitor 52 and camera 22. Depressing manual reset switch 90 has no effect when flashing light 56 is activated because open contacts 84A and 82B prevent manual deactivation coil 82 from becoming energized.

When the driver opens the door again, door switch contact 86 closes, thereby activating door closing coil 78, opening contact 78A and restarting the cycle.

The present invention may be practiced by using the following values for the circuit elements described above:

| Part    | Value or Part No.       | Part | Value or Part No. |
|---------|-------------------------|------|-------------------|
| R1      | 4.7KΩ                   | D1   | 1N4001            |
| R2      | 510KΩ                   | IC1  | TLC555CN          |
| R3      | 330KΩ                   | D2   | IN4001            |
| C1      | 100 μF                  | SW1  | C&K8551M7QE2      |
| Q1      | 2N2222A                 | D3   | IN4001            |
| Q2      | 2N7000                  | D4   | IN4001            |
| Coil 78 | 1495ES-2C-120 (Guardian)| L1   | 5100-822 25P-326A |
| Coil 80 | 1495ES-2C-120           |      | Chicago Miniture  |
| Coil 82 | 1495ES-2C-120           |      |                   |
| Coil 84 | 1495ES-2C-120           |      |                   |

While this invention has been described as having an exemplary design, the present invention may be further modified within the spirit and scope of this disclosure. For example, although the disclosed embodiment includes a reset switch for enabling the driver to deactivate the monitor after a reminder mechanism has timed out, it is clear that the reset function may be implemented by an automatic timing device. Such an automatic timing device may be set to automatically deactivate the monitor and camera combination after a predetermined time has elapsed after the reminder mechanism has timed out. Also, the duration of time that the reminder mechanism is activated may be adjusted.

Further, alternative embodiments of the present invention may use any one of number of alternative reminder devices in place of flashing light 56. Such alternative reminder devices should be able to draw the driver's attention and remind the driver to inspect the monitor. Such alternative reminder devices should also be capable of activation by control system 70 for a predetermined period of time after the driver closes the bus door. Such alternative reminder devices may include, but is not limited to, various sound generating or voiced warning devices.

Further, the control system may be implemented using IC's or IC's with a combination of discrete electronic devices rather than relays and contacts. The use of such components in control systems is known in the art. Also, the signals generated by the circuitry of the present invention may take many forms, such as voltage levels, logic levels, polarity, current levels, frequencies, pulse width modulations etc., and these signals could be manipulated using digital techniques.

The present invention may also include a recording device connected to the video camera for producing video evidence of the activity around the bus door. Such a recording device may include any conventionally known video taping machine, and may be installed to be tamper proof.

This application is therefore intended to cover any variations, uses, or adaptations of the invention using its general principles. Further, this application is intended to cover such departures from the present disclosure as come within known or customary practice in the art to which this invention pertains.

We claim:

1. A vehicle installed monitoring system for allowing a driver of a bus or a like vehicle to monitor the area around a door of the vehicle, comprising:

a camera mounted in the vicinity of the vehicle door and positioned to provide a video image of an area around the vehicle door;

a monitor mounted near the driver, said monitor operatively connected to said camera to receive and display said video image, said monitor activated in response to the opening of the vehicle door; and reminder means disposed near the driver for reminding the driver to inspect said video image, said reminder means activated for a predetermined time period in response to the closing of the vehicle door.

2. The vehicle installed monitoring system of claim 1, wherein said camera is adjustably mounted exterior of the vehicle, adjacent and rearward of the door.

3. The vehicle installed monitoring system of claim 1, wherein said camera is adjustably mounted exterior of the vehicle, adjacent and forward of the door.

4. The vehicle installed monitoring system of claim 1, further comprising means operatively connected to said monitor and said reminder means for automatically deactivating said monitor after a second predetermined time period has elapsed after said predetermined time period has elapsed.

5. The vehicle installed monitoring system of claim 1, further comprising a microphone mounted in the vicinity of the vehicle door, wherein said monitor includes a loudspeaker, said loudspeaker operatively connected to said microphone to output noises detected by said microphone.

6. The vehicle installed monitoring system of claim 5, further comprising a reset switch, said monitor deactivated by the operation of said reset switch when said reminder means is deactivated.

7. The vehicle installed monitoring system of claim 6, wherein said reminder means comprises a flashing light.

8. The vehicle installed monitoring system of claim 7, wherein said predetermined time period is about 6 seconds.

9. The vehicle installed monitoring system of claim 8, further comprising a video recorder connected to said camera.

10. The vehicle installed monitoring system of claim 6, wherein said reminder means comprises a device that produces an audible noise when activated.

11. The vehicle installed monitoring system of claim 10, wherein said predetermined time period is about 6 seconds.

12. The vehicle installed monitoring system of claim 11, further comprising a video recorder connected to said camera.

13. The vehicle installed monitoring system of claim 10, wherein said reminder means further comprises a flashing light.

14. The vehicle installed monitoring system of claim 13, wherein said predetermined time period is about 6 seconds.

15. The vehicle installed monitoring system of claim 14, further comprising a video recorder connected to said camera.

16. A vehicle installed monitoring system for allowing a driver of a bus or a like vehicle to monitor the area around a door of the vehicle, comprising:

a camera mounted in the vicinity of the vehicle door and positioned to provide a video image of an area around the vehicle door;

a microphone mounted in the vicinity of the vehicle door;

a monitor mounted near the driver, said monitor operatively connected to said camera to receive and display said video image, said monitor including a loudspeaker operatively connected to said microphone to output noises detected by said microphone, said monitor activated in response to the opening of the vehicle door;

reminder means disposed near the driver for reminding the driver to inspect said video image, said reminder means activated for a predetermined time period in response to the closing of the vehicle door; and reset means disposed near the driver for deactivating said video camera, said microphone and said monitor when said reminder means is deactivated.

17. The vehicle installed monitoring system of claim 16, wherein said predetermined time period is about 6 seconds.

18. The vehicle installed monitoring system of claim 16, wherein said reminder means comprises a flashing light.

19. The vehicle installed monitoring system of claim 16, wherein said reminder means comprises a device that produces an audible signal when activated.

20. The vehicle installed monitoring system of claim 16, further comprising a video recorder connected to said camera.

* * * * *